United States Patent Office 2,746,140
Patented May 22, 1956

2,746,140

METHOD OF SOLDERING TO THIN METALLIC FILMS AND TO NON-METALLIC SUBSTANCES

Richard B. Belser, Tucker, Ga., assignor to The Georgia Tech Research Institute, Atlanta, Ga., a corporation of Georgia No Drawing. Application July 9, 1951,
Serial No. 235,890

13 Claims. (Cl. 29—471.1)

This invention relates generally to a method of soldering to thin metallic films and to non-metallic substances, and more particularly to a simplified method of soldering to thin metallic films and non-metallic substances without the use of a flux and with a minimum of damage to the film.

Prior art methods of soldering to thin metallic films in the order of 500 to 50,000 Angstroms in thickness are in general unsatisfactory because such films are disintegrated or absorbed by commonly used fluxes and solders. In the past, it has been necessary to produce a thick metal undercoat at the point of contact and to utilize this undercoat as a foundation for the soldered junction. The application of the undercoat by usual methods is a difficult, exacting and time consuming process. Moreover, heretofore proposed methods of soldering to thin aluminum films have been unsatisfactory or impossible of accomplishment. In the case of non-metallic materials, processes proposed heretofore for making metallic bonds thereto have required high temperatures or equipment not readily available to the average individual or processor.

It is therefore an object of my invention to provide a simplified method of soldering to thin metallic films without the use of flux and with minimum damage to the film.

Another object of my invention is to provide a method of soldering directly to dielectric and semi-conducting substances generally used in the electric and electronic industries.

Another object of my invention is to provide a method of making soldered connections directly to thin metal films deposited on non-metallic substrates by evaporation, sputtering, electrolytic or chemical deposition, or otherwise, without prior deposition of a heavy metal coating at the point chosen for contact.

Another object of my invention is to provide a method of soldering directly to thin metal films, including aluminum films, without prior preparation of a spot for soldering.

Another object of my invention is to provide a method of obtaining a superior soldered joint to thin metallic films.

Another object of my invention is to provide a method of soldering directly to non-metallic materials such as glass, quartz, mica, porcelain, steatite, tile, brick, concrete, rock salt, marble, Bakelite, carbon and various silicious materials.

I have discovered a method by which the aforementioned obstacles of the prior art may be overcome and the aforesaid objects of my invention achieved. By the use of an indium rich solder, that is, solders composed of the metal indium, or more than 75% of the metal indium alloyed with lesser percentages by weight of silver, gold, copper, aluminum, or lead, I have found it possible to make soldered connections directly to thin metal films deposited on non-metallic substrates by flowing such solder directly onto the film, and I have also found that in such process no flux is necessary. A superior joint is obtained because the solder adheres to the substrate and is not dependent on the strength of the metal film as the primary feature in producing the ultimate strength of the bond. Moreover, the solder adheres directly to the metal film and thus produces a superior electrical soldered connection. It is of particular importance that by use of my method soldered connections can be made directly to aluminum films. For some reason, soldering to such films of aluminum has not previously been successfully accomplished.

From what has been said above, it will be apparent that by my method of using an indium rich solder, as hereinbefore described, it is possible to make soldered connections to non-metallic materials such as glass, quartz, mica, porcelain, steatite, tile, brick, concrete, rock salt, marble, Bakelite, carbon and various silicious materials by flowing such solder directly into contact with such materials by the use of a heated tool; and it will also be obvious from what has been said above that metal to non-metal seals are readily and simply accomplished by my method.

In conclusion, it will be understood that by using an indium rich solder and metal tool heated slightly above the melting point of the solder, I have provided a method by which electric leads or mechanical connections can be made to thin metal films deposited by presently known methods on non-metallic substrates and to the non-metallic substances in the absence of the metal film, the resulting connections being sound from both a mechanical and electrical standpoint.

It will be obvious that my invention provides a needed method of great convenience and usefulness, and that various adaptations and changes may be made therein without departing from the scope of my invention as defined in the following claims.

I claim:

1. The method of soldering a metal object to a thin metallic film bonded to a substrate, comprising flowing indium rich solder directly into contact with the film by the application of heat, so as to penetrate the film and contact the substrate and then solidifying the solder in contact with said metal object, said film and said substrate.

2. The method according to claim 1 in which the metallic film is composed of aluminum.

3. The method according to claim 1 in which the solder contains approximately 100% indium.

4. The method according to claim 1 in which the solder contains more than 75% indium.

5. The method according to claim 1 in which the solder contains more than 75% of the metal indium alloyed with a metal of the class consisting of silver, gold, copper, lead and aluminum.

6. The method according to claim 1 in which the substrate is a silicious material.

7. The method of soldering a member to a body of silicious material, comprising flowing indium rich solder into direct contact with said body by heat from a tool heated to a temperature slightly above the melting point of the solder, positioning said member in contact with said solder and then solidifying the solder in contact with said member and said body.

8. The method according to claim 7 in which the silicious material is quartz.

9. The method according to claim 7 in which the silicious material is glass.

10. The method according to claim 7 in which the solder contains approximately 100% indium.

11. The method according to claim 7 in which the solder contains more than 75% indium.

12. The method according to claim 7 in which the solder contains more than 75% of the metal indium alloyed with a metal of the class consisting of silver, gold, copper, lead and aluminum.

13. The method of soldering a metal object to a thin metallic film bonded to a substrate, comprising flowing indium rich solder into contact with the film by heat from a tool heated to a temperature slightly above the melting point of the solder in the absence of a flux, so as to penetrate the film and contact the substrate, and then solidifying the solder in contact with said metal object, said film and said substrate.

References Cited in the file of this patent

UNITED STATES PATENTS

| | | |
|---|---|---|
| 440,952 | Land | Nov. 18, 1890 |
| 2,426,650 | Sivian | Sept. 2, 1947 |
| 2,430,581 | Pessel | Nov. 11, 1947 |
| 2,438,967 | Ellsworth | Apr. 6, 1948 |
| 2,464,821 | Ludwig et al. | Mar. 22, 1949 |
| 2,627,110 | Hickey | Feb. 3, 1953 |

OTHER REFERENCES

Survey on Welding of Aluminum and Magnesium, pages 51 and 52, by Battelle Memorial Institute. Published by Office of Technical Services, Dept. of Commerce, Wash., D. C.

Product Engineering, October 1943, page 632.